Oct. 3, 1961   D. A. NEWMAN ET AL   3,002,858
INK RECEPTIVE COATING COMPOSITION
Filed May 10, 1955
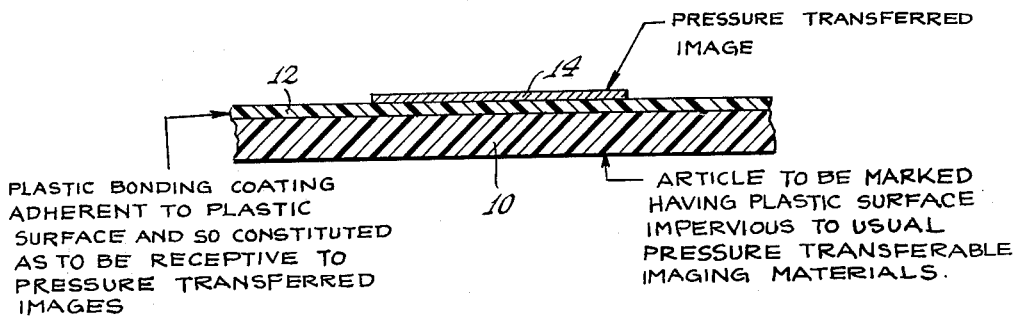
INVENTORS
Douglas A. Newman
Allan T. Schlotzhauer
BY
Johnson and Kline
ATTORNEYS 3,002,858
INK RECEPTIVE COATING COMPOSITION
Douglas A. Newman, Glen Cove, and Allan T. Schlotzhauer, Locust Valley, N.Y., assignors to Columbia Ribbon & Carbon Manufacturing Company, Inc., Glen Cove, N.Y., a corporation of New York
Filed May 10, 1955, Ser. No. 507,502
2 Claims. (Cl. 117—138.8)

This invention relates to improvements in the bonding of inscribable imaging materials in image form on the surface of substantially impermeable plastic articles.

The plastics referred to herein of which articles are made and upon which it is intended to inscribe images are those which are commercially available in various forms, as for instance, transparent, translucent or opaque sheets and laminated structures in which at least the exposed surface constitutes the plastic material.

These commercial plastics, as for instance polyester compounds such as polyethylene terephthalate sold in film form under the trademark "Mylar," various vinyl resins marketed under the trademark "Vinylite," and cellulose acetate, are fabricated into various articles such as wrappings, labels, photographic negatives, motion picture film, recording tape, tubes, insulating covering material for wiring, etc.

Heretofore, attempts have been made to image the surfaces of these articles by inscribing means such as a typewriter, employing as the imaging material a transferable ink composition carried by a transfer member such as a ribbon. The transferable ink compositon carried by the ribbon includes coloring matter such as either a soluble dye or pigment suspended in a binder which normally includes a plasticizer, as for instance, dibutyl phthalate, or tricresyl phosphate, to retain the ink somewhat fluid and thereby transferable under imaging force. While these ink compositions have transferred from the ribbon to the surfaces of the plastic materials in image form under inscribing forces to some degree, certain difficulties have been encountered. The primary difficulty has been that the bond formed between the plastic receiving surface and the imaging material is generally of such a low order that the image can be rubbed off with relative ease when subjected to ordinary use in handling.

The above difficulties are due to the characteristics of the plastic materials which are normally hard, smooth and impervious to transferable ink compositions, thereby preventing the imaging materials from being adsorbed or locked in or on the sheet.

Heretofore, various efforts have been made to overcome these difficulties, as for example, by roughening the surface to provide a tooth to improve the bonding between the image material and the surface. However, such roughening changed the appearance of the plastic material, and in some instances, rendered the material totally inoperative for its intended use. As for example, if the plastic were intended to be used as transparent wrapping the roughening would render the plastic translucent.

Another means of improving the bond has been to make the binder of the transfer imaging ink more cohesive relative to the plastic surface. This was accomplished by including as an essential ingredient of the transfer material a film-forming plastic which had been physically modified by the inclusion of a plasticizer to render the material frangible and capable of separating from the flexible foundation of the transfer member and transferring to a receiving medium when subjected to an imaging force. While this has improved the transference of the images to the plastic receiver and has resulted in a better bond, the bond thus formed has not generally been capable of withstanding continuous use or handling and the ink composition has limited usage.

It is an object of the present invention to provide means on the surface of the plastic materials intended to be inscribed for receiving the imaging material and bonding it thereto in image form with the means not affecting the underlying nature of the plastic material and not inhibiting or impairing the use of the plastic material for the purpose for which it was originally intended.

By the present invention, it has been discovered that a plastic coating composition may be applied on the normally hard, smooth plastic surfaces to cast a film which renders the surface of the plastic articles receptive to and retentive of imaging material applied thereon by inscription. It has been found that those cohesive plastics which have a surface adhesion for other plastic surfaces may be modified to give the desired results. Such plastics are the usual binders such as resins and cellulose ethers which are used in lacquers and the like, and it has been discovered that these plastics can be altered in their physical properties to produce a coating which has an affinity for the imaging materials whereby they may be permanently bonded thereon in image form.

This is accomplished by the present invention by controlling the hardness and permeability of the film cast by the coating composition by either the selection and adjustment of the suspending liquids for the plastic or by the inclusion and/or adjustment of the plasticizer in the composition. These plastics may be of the same kind of plastics and/or include the same plasticizer as that in the underlying plastic material.

The single figure of the accompanying drawing is a diagrammatic section to a large scale through an impervious plastic sheet coated and imaged in accordance with the present invention.

In carrying out the invention by the selection and adjustment of the suspending liquids, one plastic material which has produced a satisfactory coating is a cellulose ether, as for example, ethyl cellulose in the commercially available water-insoluble grades. The cellulose ether is suspended in a liquid medium in which at least two different liquids are used, one being a solvent for the cellulose and the other being substantially a non-solvent therefor at ordinary working conditions and temperatures. The liquids used must be miscible or at least capable of forming a stable, substantially homogeneous dispersion or admixture so that they will be well and uniformly distributed throughout the coating paste. As herein used the term "dispersion" has a broad significance and includes both solutions of the direct and common solvent type and stable emulsions of the liquids involved, and the expression "mutually dispersible" as applied to stated liquids denotes the capability of one or more of them for entering into such dispersions with the remainder. Also, the liquids should be of a volatile nature to the extent that they can be driven off from the cast coating by evaporation with the solvent liquid, usually an organic solvent, having a fairly high evaporation rate in relation to the non-solvent which is usually water.

It is desirable that the evaporation rates of the solvent and non-solvent be as widely diverse as feasible. In practicing the invention, it has been found that some of the more rapidly evaporating solvents do not always dissolve the binder with sufficient rapidity for coating purposes. Under these circumstances it is preferable to include with the rapidly evaporating solvent a solvent which has a lesser evaporating rate which may also be miscible or mutually dispensible with the water but which aids in dissolving the binder more rapidly.

An example of a coating mixture made according to the present invention and one which is presently preferred is given by the following formula:

| | Grams |
|---|---|
| Ethyl cellulose | 9 |
| Xylene | 60 |
| Ethyl alcohol | 16 |
| Water | 15 |

The proportions shown are intended to be illustrative only and not necessarily limiting. For example, the amount of the ethyl cellulose and the proportion of non-solvent (water) may vary between five and twenty parts depending upon whether it is desired to cast a transparent or translucent film upon the plastic material. As a general rule a transparent film is desirable in order that the underlying plastic material will have the appearance and characteristics intended for the sheet in its initial manufacture. In this form of the invention, and especially when a cellulose ether is used as the basis for the coating plastic, the proportions of solvent to non-solvent as given in the above formula, i.e. about 5:1 either by weight or volume, are most effective. It is also possible with the film cast by the present coating to increase the transparency of a translucent plastic material by filling in the voids with the coating composition, thereby reducing the refraction of the light rays which gives the translucent appearance.

The above composition, if desired, may include a small percentage of plasticizer depending upon the flexibility and workability desired.

The ingredients of the mixture set forth in the foregoing example are thoroughly intermixed, for example, by grinding in a ball mill. The resulting paste is a milky emulsion and is spread in a thin uniform coating 12 on the surface of the plastic article to be imaged, shown as a plastic sheet 10 in the drawing and allowed to dry by evaporation of the liquid constituents. The emulsion when dried casts a non-tacky, hard, colorless, transparent film which can be contacted with other articles and with surfaces of like composition without any adhering or clinging tendency.

The operation of a mixture of this character is not exactly understood, but it is thought that the solid base, ethyl cellulose in the foregoing example, by being dissolved in the solvent has the miscible but non-solvent liquid thoroughly distributed through itself. As the coating begins to dry, it appears that the solvent in evaporating more rapidly leaves the water particles, infinitesimal in size, entrapped within the partially solidified binder. As the evaporation proceeds to completion the binder loses most of the solvent and eventually most of the non-solvent particles so that it acquires a sponge-like, loosely knit, honeycomb structure forming a discontinuous phase of voids in the film cast.

The film differs substantially in physical properties from an ordinary lacquer coating. When a commercial plastic article provided with a coating as described above is inscribed with an image 14 obtained from a transfer member such as a typewriter ribbon which includes a plastic and/or a plasticizer, it is found that the image transfers readily thereto and bonds to the copy surface to such an extent that it is practically impossible to remove it by rubbing.

As presently understood, the coating of this composition makes a better molecular bond with some imaging materials, and with others it seems to have greater adsorptive properties. For instance, when transfer members comprising a flexible foundation of "Mylar" and having a gold transfer coating consisting essentially of a modified resinous binder to hold the gold therein are inscribed in image form on the coating of the present invention, the transfer material readily releases from its flexible foundation and permanently bonds to the coated plastic sheet. The permanent bonding is apparently the result of the attractive characteristics of the coating for the normally cohesive binder used in the transfer material and thus forms a better molecular bond.

However, when an ordinary typewriter ribbon is used as a transfer medium in association with the coating of the present invention, the bonding as apparently caused by the adsorptive properties of the coating composition. These adsorptive properties are apparently achieved by the loosely knit honeycomb structure of the cast film permitting the ingredients of the transferable ink composition to penetrate further into the coating than would be possible if an untreated, normally non-adsorptive, surface of the commercial plastic article were to be imaged.

Another plastic which has been found satisfactory to form a film 12 which is receptive to and retentive of imaging materials is a polyvinyl acetate, as for instance "Vinylite AYAF," made by the Bakelite Corporation. It has been found that if the "Vinylite AYAF" is dissolved in any suitable solvent, as for instance ethyl acetate, a film cast by this composition will have less hardness than the underlying plastic article and be more permeable to the printing ink compositions. Thus, for example, excellent results have been achieved by a ten percent solution of "Vinylite" and ethyl acetate which when coated on the plastic surface and dried casts a film 12 which is non-tacky and yet is retentive of the imaging materials when they are impressed thereon by inscribing means.

As presently understood, the bonding of the imaging materials to the polyvinyl acetate coating is due to the affinity and miscibility of the imaging ink plasticizers, as for instance tricresyl phosphate and dibutyl phthalate, with the polyvinyl acetate. The ten percent polyvinyl acetate composition when cast as a film apparently is sufficiently permeable to permit the plasticizers to penetrate into the coating and form an adherent bond.

In carrying out the invention by the inclusion or adjustment of the plasticizer in the coating composition to render it more pervious to transferable ink composition, as in the sponge-like coating composition described above, the plastic ingredient may be of the type usually used as binders in lacquers or the like and which cast an adherent film on the surface of the plastic material to be inscribed.

It has ben found that if the plasticizer in the coating composition is compatible and miscible with the plasticizer of the transferable ink composition and is included in sufficient quantity with the plastic binders, it will cast a film 12 with a different degre of hardness and permeability than that of the underlying plastic material and will be retentive to the ink composition in image form 14 when it is impressed thereon.

It has further been found that the coating composition may be of the same ingredients as the plastic material 10 to be inscribed differing only in the amount of plasticizer which results in a more permeable film which is retentive of the imaging material 14. For example, while commercial cellulose acetate film may include as much as twenty-five percent of dibutyl phthalate as a plasticizer to provide flexibility to the film, this commercial film is normally so hard and impervious to the ink composition that it will not retain the images thereon when subjected to ordinary handling. However, by the present invention it has been discovered that if a coating composition which includes as the film-forming ingredient cellulose acetate and also includes dibutyl phthalate as a plasticizer but in a higher percentage in volume than that in the commercial material, as for instance, fifty percent by volume, a film 12 cast by this composition on a foundation member 10 of commercial cellulose acetate will form a surface which will retain the inscribed images 14 without affecting the underlying characteristics of commercial plastic. This is apparently due to the miscibility of the plasticizer with the transferable ink composition plasticizer which may be either dibutyl phthalate or some other plasticizer of equivalent permeability or plasticizing value.

A further feature of the cellulose acetate-dibutyl phthalate composition is that it may be coated on commercial plastics which have little or no permeability to the ink composition plasticizers, as for example, polyesters. When cast as a film on the surface of the polyester plastic, the composition produces the same results as when it is coated upon the commercial cellulose acetate described above.

The cellulose acetate-dibutyl phthalate coating composition may be prepared by dissolving the cellulose acetate in any suitable volatile solvent for the same and mixing the plasticizer therein in amounts necessary to produce the desired permeability with respect to the ink compositions, and thereafter grinding all of the materials in a ball mill. The resulting paste is then spread in a thin uniform coating 12 on the smooth hard plastic surface of member 10 to be imaged and allowed to dry.

The image retentive plastic coating compositions described above may be applied on the surface of the plastic article 10 to be inscribed either by the manufacturer of the plastic article or by the ultimate user by simple brush coating procedures. Thus, the ultimate user of the plastic article, as for instance, plastic tubing, wrapping or sheet material, may readily apply the coatings since the brush coating procedure does not require expensive equipment nor does it require any particular skill. The coating dries and sets to form a film 12 which is normally transparent and does not affect the underlying characteristics of the plastic article 10 upon which it is applied.

The plastic article 10 with the layer 12 of coating composition may then be inscribed with the desired data or other information 14 to be recorded thereon with an inscribing instrument, as for instance a typewriter, employing as the transfer imaging material the ink compositions which include a plasticizer or plastic material to carry the coloring matter.

As pointed out above, the coating is more pervious to the ingredients in the transferable ink composition, and therefore, when an image is inscribed thereon with the ink composition the image is substantially permanently bonded and anchored to the coating and will withstand considerable attrition without the image being substantially impaired.

Variations and modifications may be made within the scope of the claims and portions of the improvements may be used without others.

We claim:
1. A new article of manufacture for receiving and retaining thereon a pressure-inscribed ink composition, said article comprising a substantially impermeable plastic foundation sheet the surface of which has poor retentive properties for said ink composition, and a transparent, honeycombed, spongelike, porous coating on the surface of said sheet which is miscible with said ink composition and has an adherent affinity for said foundation sheet and said ink composition, said coating comprising the residue of a coating composition including a film-forming water-insoluble plastic and a liquid medium comprising two mutually dispersible volatile fractions, one of said fractions being a solvent for said plastic and having a rapid evaporating rate, and the other fraction being substantially a non-solvent for said plastic and having a substantially lower evaporating rate, said residue being formed by evaporating said liquid medium from said coating composition.

2. A new article of manufacture for receiving and retaining thereon a pressure-inscribed ink composition, said article comprising a substantially impermeable plastic foundation sheet the surface of which has poor retentive properties for said ink composition, and a transparent, honeycombed, spongelike, porous coating on the surface of said sheet which is miscible with said ink composition and has an adherent affinity for said foundation sheet and said ink composition, said coating comprising the residue of a coating composition including a film-forming water-insoluble ethyl cellulose plastic and a liquid medium comprising two mutually dispersible volatile fractions, one of said fractions being a solvent for said ethyl cellulose plastic and having a rapid evaporating rate, and the other fraction being substantially a non-solvent for said ethyl cellulose plastic and having a substantially lower evaporating rate, said residue being formed by evaporating said liquid medium from said coating composition.

References Cited in the file of this patent
UNITED STATES PATENTS

| | | |
|---|---|---|
| 1,930,301 | Beckmann | Oct. 10, 1933 |
| 2,558,804 | Wittgren | July 3, 1951 |
| 2,578,150 | Rathke | Dec. 11, 1951 |
| 2,591,904 | Zola | Apr. 8, 1952 |
| 2,606,853 | Reese et al. | Aug. 12, 1952 |
| 2,639,253 | Reese | May 19, 1953 |
| 2,698,807 | Asaff | Jan. 4, 1955 |
| 2,872,340 | Newman et al. | Feb. 3, 1959 |

UNITED STATES PATENT OFFICE
CERTIFICATE OF CORRECTION

Patent No. 3,002,858  October 3, 1961

Douglas A. Newman et al.

It is hereby certified that error appears in the above numbered patent requiring correction and that the said Letters Patent should read as corrected below.

Column 2, line 69, for "dispensible" read -- dispersible --; column 4, line 44, for "ben" read -- been --; line 48, for "degre" read -- degree --.

Signed and sealed this 20th day of March 1962.

(SEAL)
Attest:

ERNEST W. SWIDER
Attesting Officer

DAVID L. LADD
Commissioner of Patents